United States Patent [19]
Harrison et al.

[11] 3,767,408
[45] Oct. 23, 1973

[54] DIRECT PRINT-OUT PHOTOGRAPHIC OPTICAL RECORDING MEDIA COMPRISING A RHODAMINE DYE

[75] Inventors: Sol Esther Harrison, Huntingdon Valley, Pa.; Joel Edward Goldmacher, Dutch Neck, N.J.

[73] Assignee: RCA Corporation, New York, N.Y.

[22] Filed: Jan. 28, 1972

[21] Appl. No.: 221,830

[52] U.S. Cl. ............................................. 96/90
[51] Int. Cl. ............................................. G03c 1/52
[58] Field of Search .................. 96/90 R, 90 PC, 88

[56] References Cited
UNITED STATES PATENTS
3,690,889   9/1972   Harrison et al. .................. 96/88

*Primary Examiner*—Norman G. Torchin
*Assistant Examiner*—Richard L. Schilling
*Attorney*—Glenn H. Bruestle et al.

[57] ABSTRACT

A direct print-out optical recording media consists of a rhodamine type dye dissolved in a non-polar polymeric host, the rhodamine dye being in a leuco form in the host.

12 Claims, No Drawings

DIRECT PRINT-OUT PHOTOGRAPHIC OPTICAL RECORDING MEDIA COMPRISING A RHODAMINE DYE

BACKGROUND OF THE INVENTION

This invention relates to a non-silver optical recording media which prints out an image directly upon exposure to activating radiation. More particularly, it refers to photographic film consisting of a rhodamine dye dissolved in a polymeric host to form a colorless film which becomes essentially permanently colored upon activation by ultra violet radiation.

Optical recording films which operate by means of photochemical processes in organic materials which give images directly upon exposure to radiation are known in the art. Such film may be of the photobleaching or photocoloring type. The photobleaching type of media employs a highly colored dye which is bleached by light incident thereon while the photocoloring media employs a colorless leuco compound which is subsequently colored by light. Two advantages of the photocoloring media as opposed to the photobleaching media are:

1. the wavelengths of the recording light and the light used to read the image are generally the same in photobleaching materials and a fraction of the information may be erased each time the data is read. This is not the case with photocoloring media.
2. the photocoloring media forms an image having an intensity proportional to the light absorbed while the image intensity in a photobleaching material depends also on the amount of dye remaining in an exposed area.

We have, unexpectedly, discovered that certain dyes which are highly colored in their normal state and generally thought as useful in the photobleaching type of media, can be dissolved in non-polar polymeric host materials to form a colorless film which upon exposure to activating light will become permanently colored without the need for any fixing processes.

SUMMARY OF THE INVENTION

An optical recording medium comprises a rhodamine dye dissolved in a non-polar polymeric host, the rhodamine dye being in a leuco form in the host, said dye becoming essentially permanently colored upon exposure to activating radiation.

DESCRIPTION OF THE PREFERRED EMBODIMENTS

The term rhodamine dye as used herein includes organic materials which have the structural molecular formula

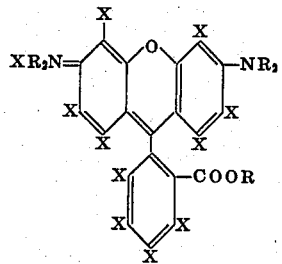

wherein each R is selected from the group consisting of hydrogen and a lower alkyl radical and may be the same or different, and further, wherein each X is selected from the group consisting of hydrogen, carboxyl, $NO_2$, halogen and a lower alkyl radical and may be the same or different. The dyes may be in the form of a non-ionizable neutral compound or may be in the form of the acid halide salt of the compound.

The novel optical recording medium comprises a rhodamine dye dissolved in a non-polar, polymeric host. Generally, rhodamine dyes exist in a highly colored state, the typical color being magenta. The solid rhodamine dye is not fluorescent and typically possesses photoconductive response due to exciton motion in the solid. When the dye is in the form of the free molecule, such as when dissolved in solution, the molecule exhibits fluorescent properties and photoconductivity is absent. When rhodamine dyes are dissolved in a polar solvent such as the lower alkyl alcohols, the resultant solution exhibits the typical magenta color of rhodamine and emits a green fluorescence on ultra violet excitation. This green fluorescence decays upon removal of the ultra violet light. When the rhodamine dye is dissolved in a non-polar solvent such as benzene, it first forms a colorless solution which represents the leuco form of the dye. Upon excitation with ultra violet light, the leuco form is converted to the colored form and upon removal of the ultra violet light, the colored form disappears and the dye returns to its leuco state. The leuco state can be identified by a blue fluorescence under ultra violet excitation.

Based on the foregoing experimental evidence, it was unexpected to find that when a rhodamine dye was dissolved in a non-polar polymer, the colored form, which appeared after ultra violet excitation of the colorless polymer solution, remained such that the polymer solution was permanently colored. Based upon the earlier observation in benzene, one would have expected that the colored form would have returned to the leuco state upon removal of the ultra violet excitation. The term permanently colored as used, takes into account that there is a very slow fading process upon exposure to visible light which, for practical purposes, is negligible.

The photochemical interaction of the novel optical medium involves one dye molecule reacting with one photon and hence is highly efficient. In addition, the resolution limit of the optical recording medium approaches molecular dimensions and for practical purposes is limited by the light source used for recording the image. Recording of an image in the novel recording medium is best performed at one of the ultra violet absorption peaks of the dye. Typically, absorption peaks are found at 3150A, 2750A and 2350A in rhodamine dyes. The novel optical recording medium typically contains a concentration of from 0.001 to 0.1gm of dye per gram of polymeric host. Typical Rhodamine useful dyes are:

Rhodamine B

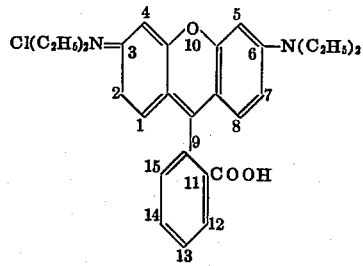

Rhodamine 6G

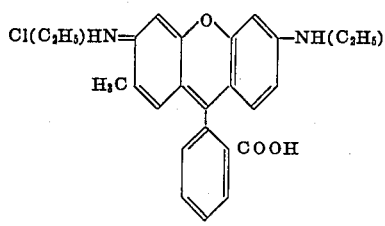

Rhodamine 3GO

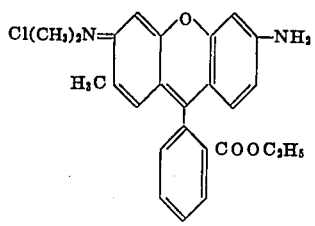

Mordant Red

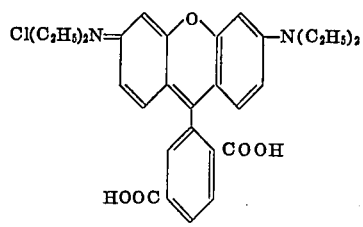

and Basic Red 8

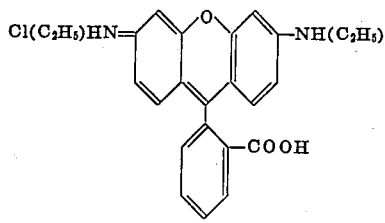

Typical non-polar polymeric hosts into which the dye is dissolved to form a normally colorless optical recording media include:

polymethyl methacrylate, polyethylene, polypropylene, polystyrene, polybutadiene and a copolymer of methyl vinyl ether and maleic anhydride.

In order to generate an optical density of one (10% transmission), energy densities of 150 to 200 millijoules/cm² are required at ultra violet wavelengths of 3,300A. Maximum sensitivity occurs at ultra violet wavelengths at or below 3,300A. The absorption of visible light by the exposed film causes no photoreaction and the image formed upon exposure to ultra violet light is permanent in nature in that its decay is not observable under normal use. It is believed that the leuco form of the dye is due to the creation of a lactone ring by the carboxyl group on the pendant phenyl ring as shown below. In addition, the leuco form of, for example, Rhodamine B is believed to differ chemically from the solid colored form by the removal of HCl:

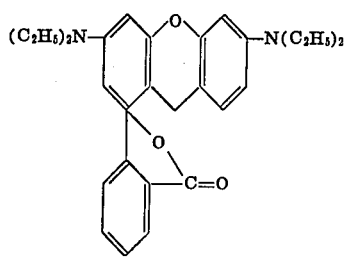

The novel optical recording medium has the advantage over other optical recording media of not requiring any activators and of having a resolution of molecular dimensions.

The rhodamine structure, as given above, appears to be extremely important in obtaining an optical recording medium which results in a fixed image. For example, if the film comprises a dye wherein the nitrogens on the third and sixth positions are replaced by oxygen, a fixed image will not result upon exposure of the film to ultra violet radiation. It is also necessary that the pendant phenyl group contain a carboxyl group on the 11th or 15th position so as to be capable of forming a lactone ring which may subsequently be broken by ultra violet radiation. Where the dye contains a carboxyl ester in the 11th or 15th position, such as in Rhodamine 3G0 it is generally necessary to acidify it in some manner so as to form a carboxylic acid.

It should be understood that the novel optical recording medium can be in the form of a self-supporting flexible tape or film, a self-supporting non-flexible member or it can be a coating applied to any surface. Such coatings can be formed by any of the well known coating techniques such as spray coating, roller coating and brush coating.

We claim:

1. An optical recording medium comprising a rhodamine dye having the structural formula

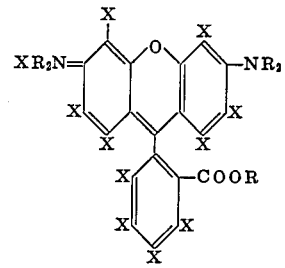

wherein each R is selected from the group consisting of hydrogen and a lower alkyl radical and may be the same or different, and each X is selected from the group consisting of hydrogen, carboxyl, $NO_2$, halogen and a lower alkyl radical and may be the same or different, dissolved in non-polar polymeric host, said recording medium being normally essentially colorless and becoming permanently colored upon exposure to activating radiation.

2. The optical recording medium recited in claim 1 in the form of a self-supporting flexible tape.

3. The optical recording medium recited in claim 1 in the form of a coating upon a substrate.

4. An optical recording medium comprising a rhodamine dye having the structural formula

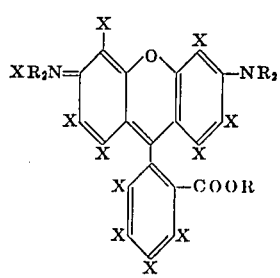

wherein each R is selected from the group consisting of hydrogen and a lower alkyl radical and may be the same or different, and each X is selected from the group consisting of hydrogen, carboxyl, $NO_2$, halogen and a lower alkyl radical and may be the same or different, said rhodamine dye being dissolved in a non-polar polymeric host, said dye being in a leuco form in said host, and becoming permanently colored upon exposure to activating radiation.

5. An optical recording medium comprising a rhodamine dye selected from the members of the group consisting of rhodamine B, rhodamine 6G, rhodamine 3GO, mordant red, and basic red 8, said dye dissolved in a non-polar polymeric host to form a colorless optical recording medium.

6. The optical recording medium recited in claim 2 wherein said non-polar polymeric host is selected from the group consisting of polymethyl methacrylate, polyethylene, polypropylene, polystyrene, polybutadiene, and a copolymer of methyl vinyl ether and maleic anhydride.

7. The optical recording medium recited in claim 5 wherein said dye is present in said polymeric host in a concentration of from 0.001 to 0.1 gram of dye per gram of polymeric host.

8. The optical recording medium recited in claim 5 wherein said dye is rhodamine B and wherein said dye is present in a concentration of from 0.001 to 0.1 gram of dye per gram of polymeric host.

9. The optical recording medium recited in claim 5 wherein said dye is rhodamine 6G and wherein said dye is present in a concentration of from 0.001 to 0.1 gram of dye per gram of polymeric host.

10. The optical recording medium recited in claim 5 wherein said dye is rhodamine 3GO and wherein said dye is present in a concentration of from 0.001 to 0.1 gram of dye per gram of polymeric host.

11. The optical recording medium recited in claim 5 wherein said dye is mordant red and wherein said dye is present in a concentration of from 0.001 to 0.1 gram of dye per gram of polymeric host.

12. The optical recording medium recited in claim 5 wherein said dye is basic red 8 and wherein said dye is present in a concentration of from 0.001 to 0.01 gram of dye per gram of polymeric host.

* * * * *